United States Patent [19]

Lee

[11] Patent Number: 5,010,869

[45] Date of Patent: Apr. 30, 1991

[54] AIR IONIZATION SYSTEM FOR INTERNAL COMBUSTION ENGINES

[75] Inventor: Jimmy L. Lee, Rohnert Park, Calif.

[73] Assignee: Zenion Industries, Inc., Rohnert Park, Calif.

[21] Appl. No.: 392,752

[22] Filed: Aug. 11, 1989

[51] Int. Cl.$^5$ .............................................. F02M 33/00
[52] U.S. Cl. .................................... 123/539; 123/536
[58] Field of Search ................ 123/536, 537, 538, 539

[56] References Cited

U.S. PATENT DOCUMENTS

| | | |
|---|---|---|
| 1,873,746 | 8/1932 | English . |
| 3,110,294 | 11/1963 | Nyman . |
| 3,266,783 | 8/1966 | Knight . |
| 3,476,095 | 11/1969 | De Laubarede . |
| 3,711,743 | 1/1973 | Bolasny . |
| 3,761,062 | 9/1973 | King . |
| 3,943,407 | 3/1976 | Bolasny . |
| 3,963,408 | 6/1976 | Youngberg . |
| 3,989,017 | 11/1976 | Reece . |
| 4,071,004 | 1/1978 | Ostergaard . |
| 4,232,355 | 11/1980 | Finger . |
| 4,308,844 | 1/1982 | Persinger .......................... 123/539 |
| 4,519,357 | 5/1985 | McAllister .......................... 123/537 |

FOREIGN PATENT DOCUMENTS

| | | | |
|---|---|---|---|
| 0043477 | 1/1982 | European Pat. Off. ............ 123/536 |
| 2278934 | 2/1976 | France .................................. 123/539 |
| 2476221 | 8/1981 | France . | |
| 0198366 | 10/1985 | Japan .................................... 123/536 |

Primary Examiner—Andrew M. Dolinar
Assistant Examiner—M. Macy
Attorney, Agent, or Firm—Larry D. Johnson

[57] ABSTRACT

This invention relates to a combustion air ionization method and apparatus for internal combustion engines. In the preferred method, combustion air is moved past an electrical charge source. A voltage source providing a series of voltage pulses of a single polarity ranging from a non-zero base voltage to a predetermined peak voltage is connected in a circuit path to the electrical charge source. The preferred apparatus practicing this method consists essentially of an electrical charge source disposed within a container upstream of the engine's combustion air intake. The voltage source applies its voltage pulses to the charge source, thereby ionizing the air moving past the charge source.

32 Claims, 4 Drawing Sheets

U.S. Patent    Apr. 30, 1991    Sheet 1 of 4    5,010,869
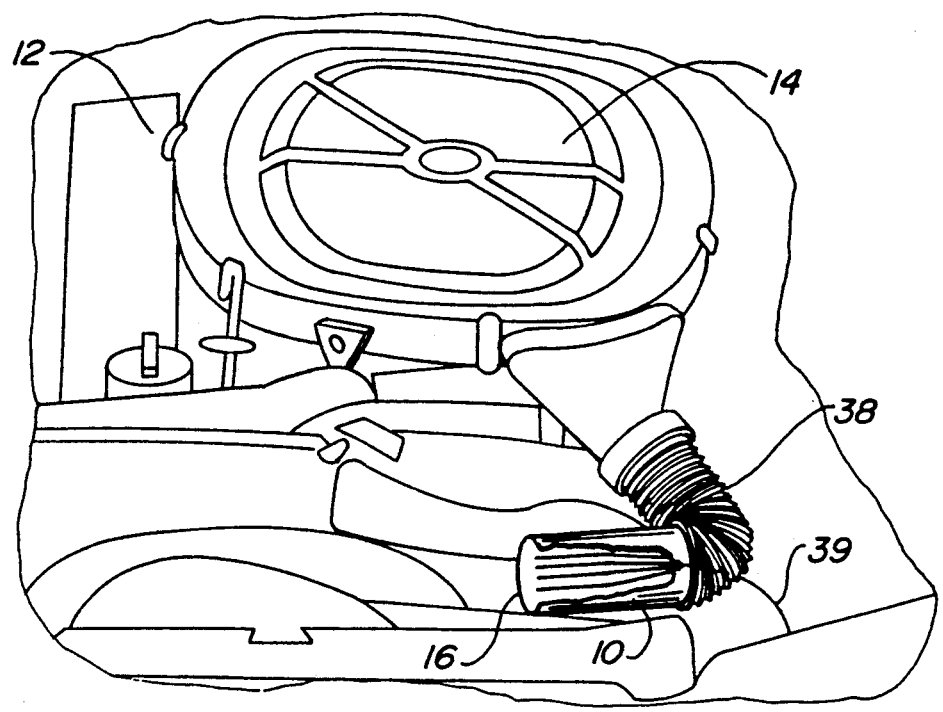
FIG._1
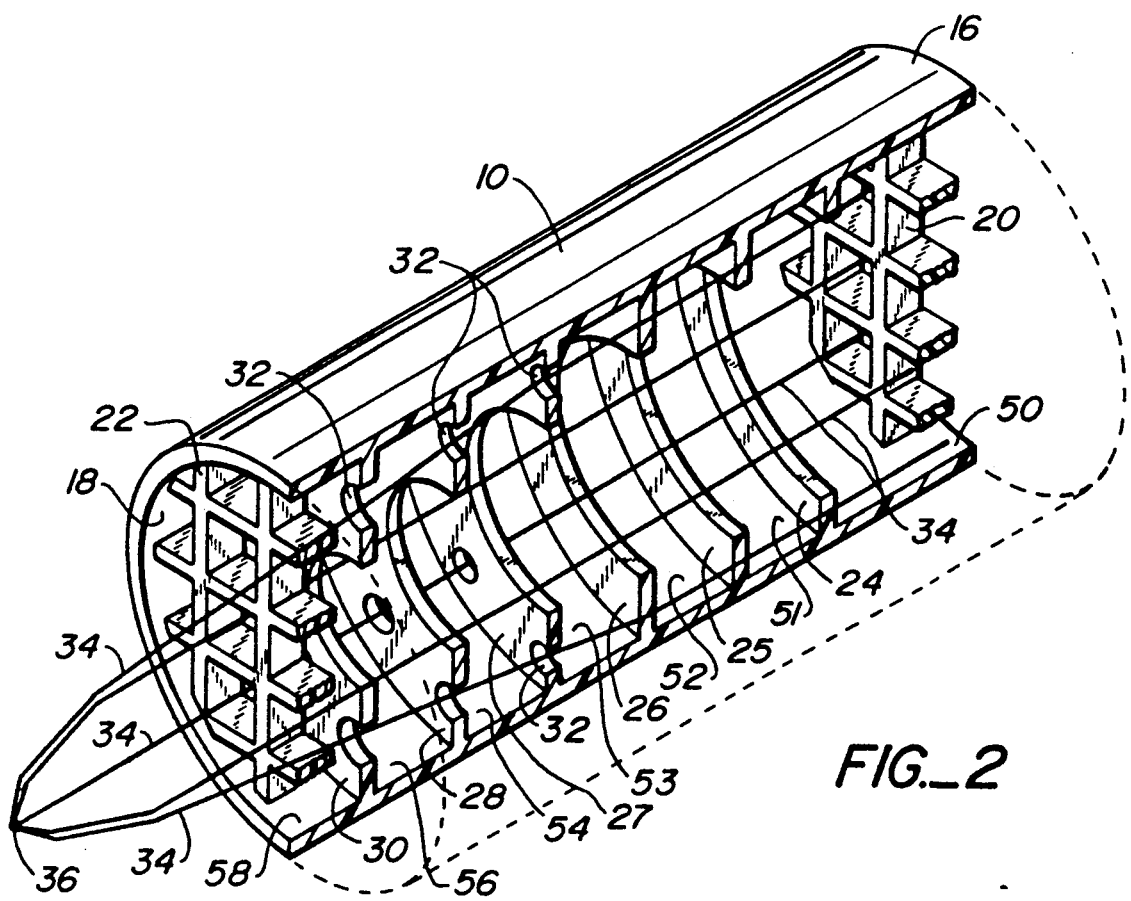
FIG._2

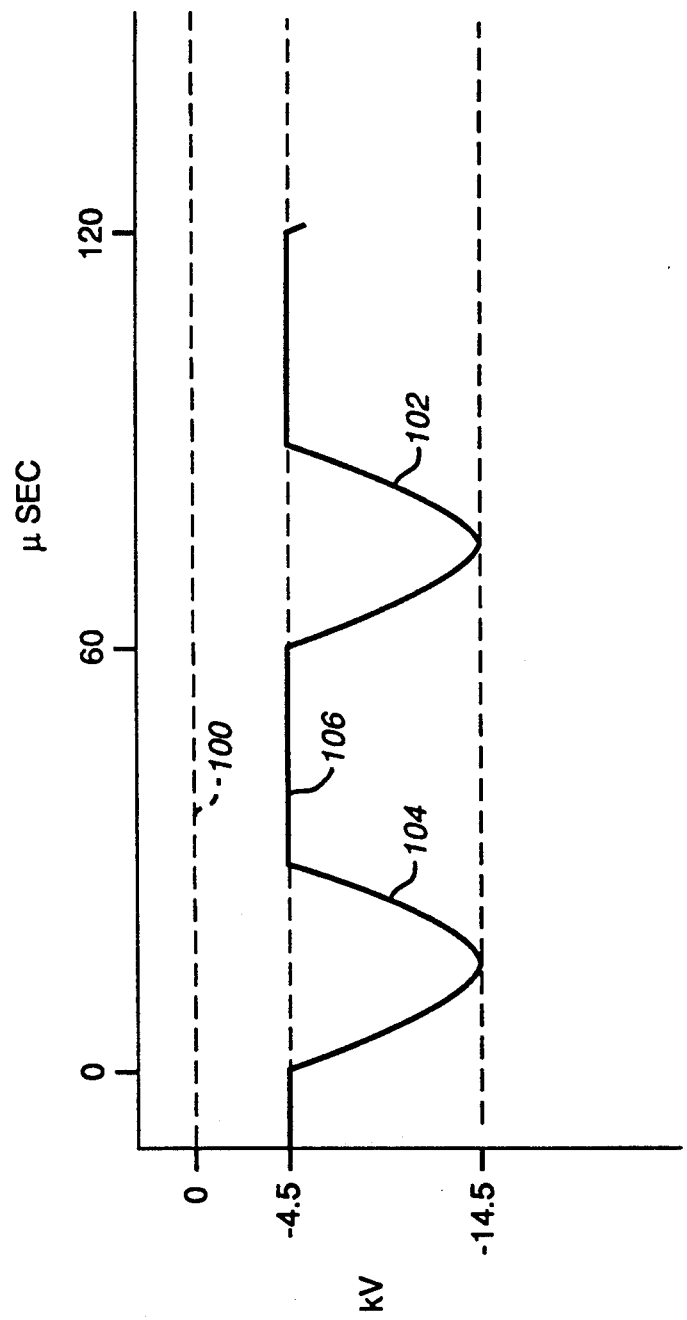
FIG._3

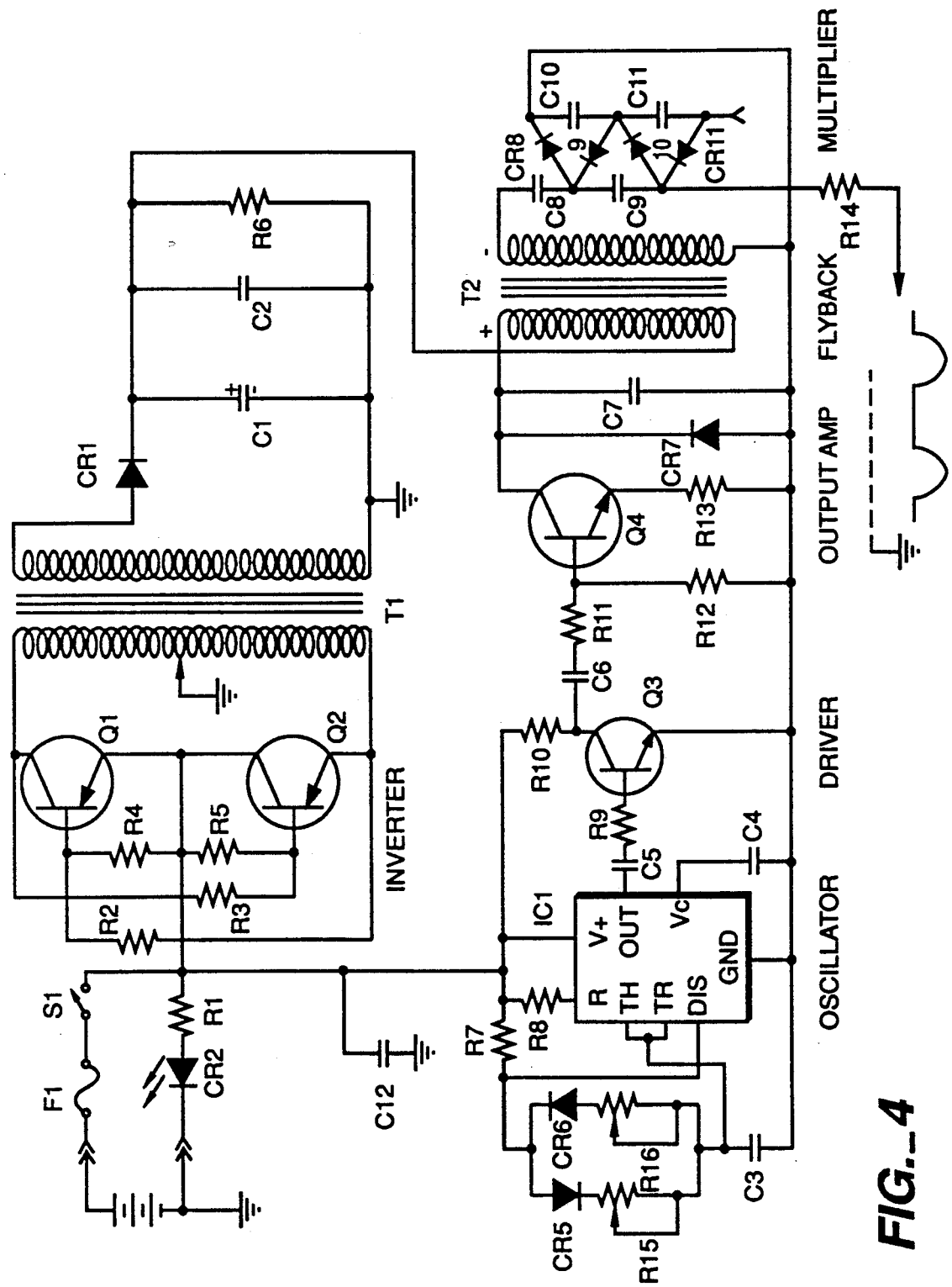
FIG._4

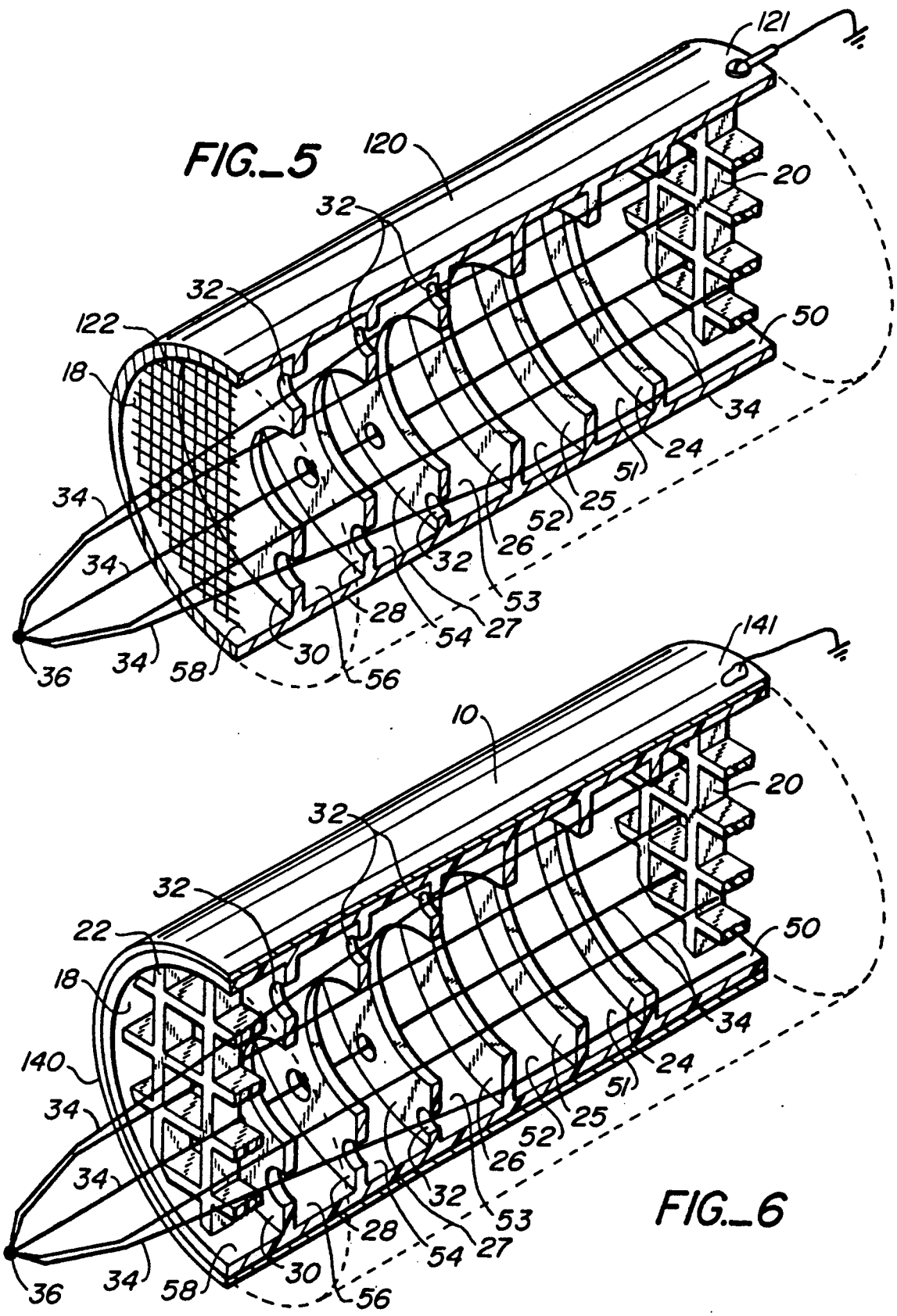

AIR IONIZATION SYSTEM FOR INTERNAL COMBUSTION ENGINES

BACKGROUND OF THE INVENTION

This invention relates generally to air ionization systems and in particular to air ionization systems for use with internal combustion engines.

The prior art is replete with inventions designed to increase the efficiency of internal combustion engines. Many of these inventions have focused on techniques designed to improve the mixing of air and fuel.

An ionized mixture of air and fuel mixes more thoroughly, thereby improving the fuel's combustion. In addition, most electrostatic techniques produce some ozone as a byproduct of the ionization process. Ozone reacts more readily with hydrocarbons than oxygen does. Furthermore, electrically charged liquid fuel droplets resist coalescing into larger droplets, thereby permitting the fuel to be mixed more thoroughly with the air.

A number of patents disclose methods and apparatuses for ionizing combustion air and/or fuel prior to combustion. Examples are: U.S. Pat. No. 1,873,746; U.S. Pat. No. 4,071,004; U.S. Pat. No. 3,989,017; U.S. Pat. No. 3,963,408; U.S. Pat. No. 3,761,062; U.S. Pat. No. 3,476,095; U.S. Pat. No. 3,266,783; and U.S. Pat. No. 3,110,294. The disclosures of these patents are incorporated herein by reference.

The prior art has recognized, however, that D.C. voltages in excess of 5000 volts tend to produce large amounts of ozone. See, e.g., U.S. Pat. No. 3,711,743, the disclosure of which is incorporated herein by reference. Ozone is very reactive and will degrade metal, plastic and rubber components. It is therefore necessary in some circumstances to limit the amount of ozone produced during ionization of air.

My earlier U.S. Pat. No. 4,789,801 disclosed an electrokinetic apparatus for ionizing and moving air while minimizing the production of ozone and oxides of nitrogen. The disclosure of that patent is incorporated herein by reference. That patent, however, did not disclose any apparatus or method for ionizing combustion air for internal combustion engines.

SUMMARY OF THE INVENTION

One problem with prior art air ionization systems for internal combustion engine applications is their high ozone production. Because of the degrading effects of ozone, there is a need for a method and apparatus for ionizing combustion air for internal combustion engines while minimizing ozone production. One object of this invention, therefore, is to provide an ionization method and apparatus which minimizes ozone production.

Another drawback of prior art devices is their relatively low level of ionization. The level of ionization must be maximized in order to counteract charge losses to objects downstream of the ion generator. A further object of this invention, therefore, is to provide an ionization method and apparatus which maximizes ion production while minimizing ozone production.

This invention meets these objects by providing a combustion air ionization method for internal combustion engines whereby combustion air passes by an electrical charge source. A voltage source providing a series of voltage pulses of a single polarity ranging from a non-zero base voltage to a predetermined peak voltage is connected in a circuit path to the electrical charge source. The voltage source energizes the charge source to ionize the air passing by the charge source.

The preferred apparatus for practicing this method consists essentially of an electrical charge source disposed within a container upstream of the engine's combustion air intake. The voltage source applies its voltage pulses to the charge source, thereby ionizing the air moving past the charge source.

The invention is described more particularly below with reference to the drawings.

BRIEF DESCRIPTION OF THE DRAWINGS

FIG. 1 is an elevational view of an automobile engine compartment showing the preferred placement of the apparatus according to this invention for retrofit applications.

FIG. 2 is a sectional view of the preferred embodiment of this invention.

FIG. 3 is a graph showing the preferred voltage versus time characteristics of the voltage source of this invention.

FIG. 4 is a schematic circuit diagram of the voltage source according to the preferred embodiment of this invention.

FIG. 5 is a sectional view of an alternative embodiment of this invention.

FIG. 6 is a sectional view of another alternative embodiment of this invention.

DETAILED DESCRIPTION OF THE PREFERRED EMBODIMENT

The air ionization system according to the preferred embodiment of this invention is shown in FIGS. 1 and 2. An ionization tube 10 is inserted in the air intake line of an internal combustion engine 12 upstream of an air cleaner 14. Ionization tube 10 has an inlet 16 and an outlet 18. Inlet 16 is covered by a screen or grid 20 of a suitable non-conducting material, and outlet 18 is covered by a similar screen or grid 22. The purpose of the screens is to prevent foreign objects from entering the device and to prevent any objects from leaving the device and entering the engine's carburetor or intake manifold.

Ionization tube 10 is preferably formed from an acrylic polycarbonate like Lexan, manufactured by the General Electric Company. Alternatively, ionization tube 10 may be made from any high dielectric material.

Ionization tube 10 is divided into seven chambers 50, 51, 52, 53, 54, 56 and 58 by six baffles or rings, 24, 25, 26, 27, 28 and 30. As shown in FIG. 2, the diameter of the inner perimeter of rings 24–30 decreases along the length of ionization tube 10. In addition, rings 27, 28 and 30 have a plurality of holes 32 spaced substantially uniformly around the rings between the inner and outer perimeters thereof. The diameter of the holes 32 increases along the length of ionization tube 10. Rings 24–30 are formed from the same material as ionization tube 10. The purpose of rings 24–30 and of holes 32 will be explained below.

Disposed within ionization tube 10 is a charge source consisting of a plurality of tungsten filaments 34. As shown in FIGS. 1 and 2, filaments 34 extend from inlet 16 through rings 24–30 and through outlet 18 where they are joined together to form a junction 36. The filaments must be thick enough to provide sufficient tensile strength and thin enough to provide sufficient emissivity. In the preferred embodiment, the charge source consists of 12 tungsten filaments which are between 4 and 6 mils thick. Figs. 1 and 2 show fewer than 12 filaments for the purpose of clarity. Another emissive material may be used in place of tungsten filaments 34 and any number of filaments may be used.

An outlet tube 38 is attached to the outlet 18 of ionization tube 10. Outlet tube 38 leads from ionization tube 10 to air cleaner 14.

A voltage source 40 is attached to junction 36 via a suitable conductor 39. Voltage source 40 supplies a base negative voltage of 4.5 kV D.C. Superimposed on this base voltage is a periodic voltage pulse of negative 10 kV with a duration of 10 to 40 microseconds. The shape of the negative voltage pulse is that of a half sine wave. The voltage pulse repeats every 60 microseconds, i.e., there is a pause of 20 to 50 microseconds between each pulse.

FIG. 3 is a graphic representation of a typical voltage signal curve according to this invention. The voltage signal 102 is offset from the zero reference voltage 100 by −4.5 kV. A 30 microsecond sinusoidal voltage pulse 104 peaks at −14.5 kV. The voltage pulse 104 is followed by a pause 106 of 30 microseconds where the voltage remains substantially constant at −4.5 kV. The cycle repeats every 60 microseconds.

The circuit providing the voltage source is shown schematically in FIG. 4. The circuit is basically a single polar or bipolar multiplier circuit commonly used in video display terminals modified for a 50 percent ripple. While the circuit shown in FIG. 4 is readily understandable to one of ordinary skill in the art, certain elements of the circuit are explained more particularly below.

Referring to FIG. 4, an inverter circuit is formed from transistors $Q_1$ and $Q_2$ and associated circuitry (i.e., resistors $R_2$, $R_3$, $R_4$, and $R_5$) to operate as a conventional D.C. to A.C. converter, driving a transformer $T_1$ to convert a D.C. voltage (here, a 12-volt supply provided by an automobile battery) to an A.C. voltage. The A.C. voltage from the secondary of the transformer $T_1$ is converted to a D.C. voltage of approximately 150 volts by the diode $CR_1$ and by capacitors $C_1$ and $C_2$, and is then applied to one terminal of the primary of flyback transformer $T_2$. The other terminal receives a negative-going pulsating signal which is initiated by an integrated circuit oscillator $IC_1$ and is amplified by the transistor circuitry of $Q_3$ and $Q_4$ and associated support elements. The secondary of the flyback transformer $T_2$ is coupled to a multiplier circuit comprising principally the capacitors $C_8$, $C_9$, $C_{10}$, and $C_{11}$, interconnected by the diodes $CR_8$, $CR_9$, $CR_{10}$, and $CR_{11}$. The output of the multiplier circuit produces the waveform as shown in FIG. 3. The pulse width of the negative-going pulses is selected by adjustment of $R_{15}$.

In operation, air is drawn into inlet 16 by the negative pressure within air cleaner 14. Rings 24-30 create relatively static pockets of air within each chamber surrounding and adjacent to filaments 34. The holes 32 formed in rings 24-30 help keep the airflow through ionization tube 10 laminar.

The modulating negative voltage on filaments 34 ionizes the air in chambers 50-58. The negative ions (anions) generated in the chambers are entrained by the air moving through the center of rings 24-30 and by the air moving through holes 32 in rings 24-30. This arrangement and operation of the ionization tube minimizes ozone production while maximizing ion production. This apparatus has the added benefit of increasing the static pressure of the incoming air due to the effect of the ionization process.

The dimensions of the device may be modified to fit the application. For a 400 hp 500 cu.in. gasoline engine, for example, tube 10 is approximately 6⅜ inches long with an outer diameter of approximately 3 inches. For a 52 hp diesel engine, tube 10 is approximately 7 inches long with an outer diameter of approximately 2 inches.

The operation of the invention may be varied in different applications. For a 400 hp 500 cu.in. gasoline engine, for example, the voltage to the tungsten filaments—and, therefore, the amount of ions produced—may be varied according to the load on the engine in any manner known in the art. For a smaller engine, on the other hand, such as a 52 hp diesel engine, the device may be run at a single output level without regard to the load on the engine.

While the embodiment disclosed above is located at the air cleaner intake for ease of retrofit, the apparatus may also be disposed after the air cleaner and closer to the air/fuel mixing point. Placing the ion generator closer to the engine minimizes the loss of charge to metal engine parts between the ion generator and the combustion chamber.

The ionization apparatus of this invention may be modified to include a copper grid coated with manganese dioxide located at the outlet to the ionization tube 10. The manganese dioxide reacts with the ozone flowing through the grid and removes a substantial portion of the ozone from the ionization tube effluent. The grid may be either charged or grounded. In addition, the manganese dioxide may be replaced with any other material suitable for removing ozone.

An alternative embodiment of this invention is shown in FIG. 5. The plastic ionization tube 10 of the previous embodiment is replaced with a metal tube 120. Tube 120 is connected electrically to ground via a suitable connector 121. When the voltage source is applied to the filaments 34 in tube 120, a cold corona discharge occurs between tube 120 and filaments 34. This discharge increases the ionization of the air and requires a greater power input to the device.

This arrangement also increases ozone production. The exit grid 22 of the previous embodiment is therefore replaced with a manganese dioxide coated copper grid 122 which is either grounded or charged with a constant voltage.

A third embodiment is shown in FIG. 6. This embodiment uses a plastic tube 10 covered with metal foil 140. The foil 140 is electrically connected to ground via a suitable connector 141. The plastic of tube 10 therefore acts like a dielectric, thereby increasing the potential between the foil 140 and filaments 34. This arrangement produces more ions than the first embodiment and less ozone than the second embodiment. A manganese dioxide coated copper grid may be added to the outlet of the device of this third embodiment to minimize the effects of the ozone produced.

Other modifications to this invention will be apparent to those of ordinary skill in the art. Such modifications may be made without departing from the scope of this invention.

What is claimed is:

1. A combustion air ionization apparatus for internal combustion engines comprising:
    a container having an air inlet and an air outlet;

means for communicating the container air outlet with the combustion air inlet of an internal combustion engine;

an electrical charge source disposed in the container;

a voltage source connected in a circuit path to the electrical charge source, said voltage source providing a series of voltage pulses of a single polarity ranging from a non-zero base voltage to a predetermined peak voltage; and means for creating pockets of static air in the container said means for creating pockets of static air comprising a baffle disposed in the container.

2. The apparatus of claim 1 further comprising means for making the air flow laminar in the container.

3. The apparatus of claim 2 wherein the means for making the air flow laminar comprises holes in the baffle which permit air to flow through.

4. The apparatus of claim 1 wherein the voltage source also provides intervals of constant voltage between the voltage pulses.

5. The apparatus of claim 1 wherein the charge source is a metal filament.

6. The apparatus of claim 5 wherein the metal filament is made of tungsten.

7. The apparatus of claim 1 wherein the container is formed from a non-metal dielectric.

8. The apparatus of claim 7 further comprising metal disposed on the exterior of the container.

9. The apparatus of claim 8 wherein the metal is grounded.

10. The apparatus of claim 9 wherein the container has means for removing ozone from the air disposed substantially at the air outlet.

11. The apparatus of claim 1 wherein the container is formed from a metal.

12. The apparatus of claim 11 wherein the metal is grounded.

13. The apparatus of claim 12 wherein the container has means for removing ozone from the air disposed substantially at the air outlet.

14. A combustion air ionization apparatus for an internal combustion engine comprising:

a container having an air inlet and an air outlet;

means for communicating the container air outlet with the combustion air inlet of an internal combustion engine;

an electrical charge source disposed in the container;

a voltage source connected in a circuit path to the electrical charge source, said voltage source providing a series of voltage pulses of a single polarity ranging from a non-zero base voltage to a predetermined peak voltage;

means for creating pockets of static air in the container, said means for creating pockets comprising a baffle disposed in the container; and means for making the air flow laminar in the container, said means for making the air flow laminar comprising holes in the baffle which permit air to flow through.

15. The apparatus of claim 14 wherein the internal combustion engine is a diesel engine.

16. The apparatus of claim 14 wherein the internal combustion engine is a gasoline engine.

17. A method for ionizing combustion air for internal combustion engines comprising:

providing an electrical charge source disposed in an ionization area upstream from the engine;

moving combustion air through the ionization area;

creating a pocket of static air adjacent the charge source in order to increase ionization; and applying a series of voltage pulses to the charge source while the combustion air is moving through the ionization area, the voltage pulse being of a single polarity ranging from a non-zero base voltage to a predetermined peak voltage, whereby an electrical charge is passed between the charge source and the combustion air, thereby ionizing the air.

18. The method of claim 17 further comprising the step of making the air move in a laminar flow in the region of the charge source.

19. The method of claim 17 wherein the voltage pulse providing step further comprises providing intervals of constant voltage between the voltage pulses.

20. The method of claim 17 further comprising the step of placing a grounded conductive member adjacent the charge source, the combustion air moving by the grounded conductive member.

21. The method of claim 20 further comprising the step of removing ozone from the combustion air before the air enters the engine.

22. The method of claim 20 further comprising the step of placing a solid dielectric member between the grounded conductive member and the moving air.

23. The method of claim 22 further comprising the step of removing ozone from the combustion air before the air enters the engine.

24. A method for ionizing combustion air for internal combustion engines comprising:

providing an electrical charge source disposed in an ionization area upstream from the engine;

moving combustion air through the ionization area;

creating a pocket of static air adjacent the charge source in order to increase ionization;

making the air flow laminar in the region of the charge source; and applying a series of voltage pulses to the charge source while the combustion air is moving through the ionization area, the voltage pulse being of a single polarity ranging from a non-zero base voltage to a predetermined peak voltage;

whereby an electrical charge is passed between the charge source and the combustion air, thereby ionizing the air.

25. The method of claim 24 wherein the engine is a diesel engine.

26. The method of claim 24 wherein the engine is a gasoline engine.

27. A combustion air ionization apparatus for an internal combustion engine comprising:

a container having an air inlet and an air outlet;

means for communicating the container air outlet with the combustion air inlet of an internal combustion engine;

an electrical charge source disposed in the container;

a voltage source connected in a circuit path to the electrical charge source, said voltage source providing a series of voltage pulses of a single polarity ranging from a non-zero base voltage to a predetermined peak voltage; and means for creating pockets of static air in the container adjacent to the charge source in order to increase ionization.

28. The apparatus of claim 27 wherein the means for creating pockets of static air comprises a plurality of baffles disposed in the container.

29. The apparatus of claim 28 wherein the charge source comprises a plurality of metal filaments and the baffles have a plurality of holes, the metal filaments extending longitudinally through the container and passing through the holes in the baffles.

30. A combustion air ionization apparatus for internal combustion engines comprising:

a container having an air inlet and an air outlet;

means for communicating the container air outlet with the combustion air inlet of an internal combustion engine;

an electrical charge source disposed in the container;

a voltage source connected in a circuit path to the electrical charge source, said voltage source providing a series of voltage pulses of a single polarity ranging from a non-zero base voltage to a predetermined peak voltage; and means for removing ozone from the air disposed substantially at the air outlets.

31. The apparatus of claim 30 wherein the means for removing ozone comprises a copper grid coated with a material suitable for removing ozone.

32. The apparatus of claim 31 wherein the material suitable for removing ozone is manganese dioxide.

* * * * *